United States Patent
Colgan et al.

(10) Patent No.: US 6,789,957 B1
(45) Date of Patent: Sep. 14, 2004

(54) HIGH-DENSITY OPTOELECTRONIC TRANSCEIVER ASSEMBLY FOR OPTICAL COMMUNICATION DATA LINKS

(75) Inventors: Evan G. Colgan, Chestnut Ridge, NY (US); Casimer M. DeCusatis, Poughkeepsie, NY (US); Lawrence Jacobowitz, Wappingers Falls, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/250,102

(22) Filed: Jun. 4, 2003

(51) Int. Cl.[7] ............................. G02B 6/00; G02B 6/36
(52) U.S. Cl. ........................................ 385/89; 385/147
(58) Field of Search ................................ 385/14, 88–90, 385/100, 147; 174/50; 398/46; 359/320

(56) References Cited

U.S. PATENT DOCUMENTS

| | | | |
|---|---|---|---|
| 4,838,630 A | * | 6/1989 | Jannson et al. ................. 359/3 |
| 5,539,559 A | | 7/1996 | Cisnerso et al. |
| 5,555,127 A | * | 9/1996 | Abdelkader et al. ..... 359/341.1 |
| 5,912,751 A | * | 6/1999 | Ford et al. ..................... 398/46 |
| 5,963,684 A | | 10/1999 | Ford et al. |
| 6,061,481 A | * | 5/2000 | Heidrich et al. .............. 385/14 |
| 6,259,121 B1 | | 7/2001 | Lemoff et al. |
| 6,117,699 A1 | | 9/2001 | Lemoff et al. |
| 6,453,081 B1 | | 9/2002 | Trezza et al. |
| 2002/0114587 A1 | * | 8/2002 | Golwalkar et al. ........... 385/88 |
| 2002/0129954 A1 | * | 9/2002 | Griffis ......................... 174/50 |
| 2002/0131259 A1 | * | 9/2002 | Rozy et al. ................. 361/818 |

FOREIGN PATENT DOCUMENTS

| | | |
|---|---|---|
| EP | 1100168 | 5/2001 |
| WO | WO9309456 | 8/1993 |

* cited by examiner

Primary Examiner—Akm Enayet Ullah
(74) Attorney, Agent, or Firm—James J. Cioffi; Cantor Colburn LLP

(57) ABSTRACT

An optoelectronic transceiver assembly includes a plurality of optical transmission devices coupled to a first end of a multimode optical fiber core. Each of the plurality of optical transmission devices generates light at a different wavelength with respect to one another. A wavelength demultiplexing device is coupled to a second end of the multimode optical fiber core, and a plurality of optical detection devices is in proximity to the demultiplexing device. The optical detection devices receive light transmitted by the plurality of optical transmission devices.

20 Claims, 4 Drawing Sheets

HIGH-DENSITY OPTOELECTRONIC TRANSCEIVER ASSEMBLY FOR OPTICAL COMMUNICATION DATA LINKS

BACKGROUND OF INVENTION

The present invention relates generally to optical communication systems and, more particularly, to a high-density optoelectronic (O/E) transceiver for high speed, parallel optical communication data links.

There are many well-recognized benefits of using optical fiber to replace copper wiring for printed circuit boards (PCBs) in computer and networking equipment. Such potential benefits include increased bandwidth and data rate, overcoming bottlenecks in the processing architecture, immunity to electromagnetic interference and reductions in radiated noise from the system, reduced latency by elimination of optical/electrical (OLE) conversions, more dense packaging at lower cost per pin, and enablement of new processor interconnect technologies such as meshed rings. These and other factors directly contribute to the performance of the computer system (e.g., increased processing power in MIPS (million instructions per second) or FLOPS (floating-point operations per second), increased node count in parallel architectures, etc.).

With the dramatic increase in processor speed over the last several years and the anticipation that this trend will continue, the copper interconnect technology will be unable scale to the bandwidth requirements of the processing units. Fiber optic components, on the other hand, do not suffer from the bandwidth/distance constraints of copper and are thus becoming a preferred medium for very high bandwidth transmission between processing units. But, in order to fully realize these benefits, the optical fiber interconnect components should also continue to provide the same benefits of the existing electrical connection technologies.

In certain applications, it is desirable to have an optoelectronic transceiver with the highest possible area density. The data bandwidth at which an O/E (optoelectronic) transceiver can transmit or receive information can be increased by increasing the serial data rate per each channel, increasing the number of channels, and/or sending and receiving multiple light wavelengths along each fiber with wavelength division multiplex technology (WDM) (i.e., employing dense wavelength division multiplexing (DWDM) or coarse wavelength division multiplexing (CWDM)). Typically, it has been cheapest and easiest to first increase the serial data rate, and then increase the number of channels. The use of DWDM or CWDM has generally been limited to cases where installing more optical fibers would result in a large enough expense to justify the use of DWDM or CWDM.

It is highly desirable to follow industry standards for O/E transceivers such that multiple sources of supply are available. However, this approach limits the number of fibers per unit area since, for parallel optics cables and connectors, the current industry standard is a 1×12 array with the fibers disposed on 250 micron (1¼m) centers with a MT ferrule for the connection. Newer standards are evolving based upon multiple stacked, 1×12 arrays (again with a MT ferrule for the connection). Because existing WDM and CWDM technologies generally require bulky optics and multiple edge emitting lasers of different wavelengths, this results in a relatively large space needed for accommodating WDM and CWDM O/E transceivers. Thus, it would be desirable to have a more compact and simpler means of implementing and forming a parallel DWDM or CWDM O/E transceiver.

SUMMARY OF INVENTION

The foregoing discussed drawbacks and deficiencies of the prior art are overcome or alleviated by an optoelectronic transceiver assembly including a plurality of optical transmission devices coupled to a first end of a multimode optical fiber core. Each of the plurality of optical transmission devices generates light at a different wavelength with respect to one another. A wavelength demultiplexing device is coupled to a second end of the multimode optical fiber core, and a plurality of optical detection devices is in proximity to the demultiplexing device. The optical detection devices receive light transmitted by the plurality of optical transmission devices.

In another aspect, an optoelectronic transceiver assembly includes a plurality of vertical cavity surface emitting lasers (VCSELs) butt coupled to a first end of a multimode optical fiber core. Each of the plurality of VCSELs generates light at a different wavelength with respect to one another. A hologram is butt coupled to a second end of the multimode optical fiber core, the hologram configured for demultiplexing light of the different wavelengths. In addition, a plurality of photodiodes is in proximity to the hologram, wherein the hologram is further configured to direct light of the different wavelengths to different ones of the photodiodes.

In still another aspect, a computer backplane interconnection system includes a first backplane having a first chip carrier associated therewith, and a second backplane having a second chip carrier associated therewith. An optoelectronic transceiver assembly provides signal communication between a first chip associated with the first chip carrier and a second chip associated with the second chip carrier. The optoelectronic transceiver further includes a plurality of optical transmission devices coupled to a first end of a multimode optical fiber core, with each of the plurality of optical transmission devices generating light at a different wavelength with respect to one another. A wavelength demultiplexing device is coupled to a second end of the multimode optical fiber core, and a plurality of optical detection devices is in proximity to the demultiplexing device. The optical detection devices receive light transmitted by the plurality of optical transmission devices.

BRIEF DESCRIPTION OF DRAWINGS

Referring to the exemplary drawings wherein like elements are numbered alike in the several Figures.

DETAILED DESCRIPTION

Disclosed herein is a high-density O/E transceiver that utilizes WDM technology in combination with multimode fibers for data communication applications. Briefly stated, a plurality (e.g., four) of optical transmitting devices such as vertical cavity surface emitting lasers (VCSELs) are grouped closely together in a generally square pattern (e.g., with a center to center spacing of about 20–30 microns) to form an array that is coupled to the core of a multimode fiber having a standard diameter of 50 or 62.5 microns. The emitting region of each VCSEL in the array is about 10 to 15 microns in diameter, and each is configured to transmit light at a different wavelength. A corresponding array of light detecting devices (such as photodiodes) is coupled at an opposite end of the multimode fiber. The combination of multimode fiber and CWM technology thus allows for additional data bandwidth without the need for additional expensive coupling optics, as described in greater detail hereinafter.

Figure 1:
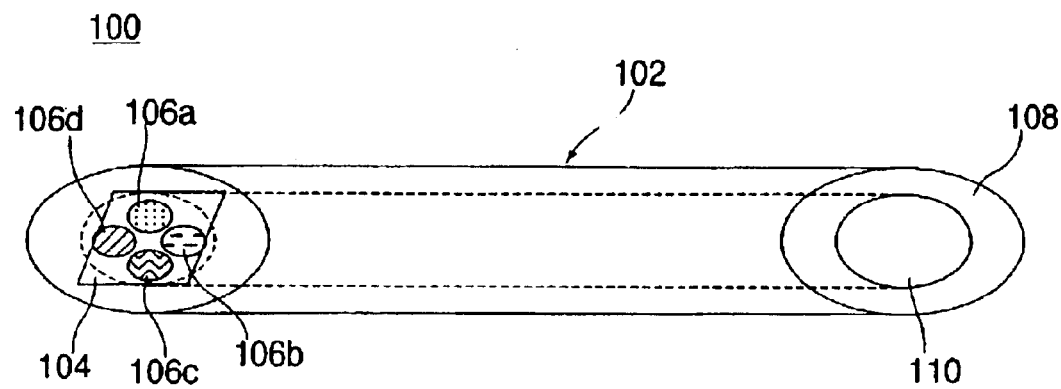
FIG. 1 is a perspective view of a high density, optoelectronic (O/E) transceiver, in accordance with an embodiment of the invention.

Referring initially to FIG. 1, there is shown a perspective view of a high density, optoelectronic (O/E) transceiver 100, in accordance with an embodiment of the invention. In particular, FIG. 1 illustrates the coupling relationship between one end of a multimode optical fiber 102 and an array 104 of individual VCSELs 106a–106d. As indicated earlier, each VCSEL in the array 104 is configured to produce light at different wavelengths. This may be accomplished, for example, by varying the cavity structure of each device such that four different wavelengths of light are produced. Additional information regarding monolithic, multiple wavelength VCSEL arrays may be found in U.S. Pat. No. 6,259,121 to Lemoff, et al.

However, heretofore, such multiple wavelength VCSEL arrays have been used in conjunction with single-mode fiber or ribbons/bundles of optical fibers. In contrast, the multimode fiber 102 of FIG. 1 has an industry standard outer cladding 108 of about 125 μm in diameter, with a core 110 available in a 50 μm or a 62.5 μm diameter. As such, the four VCSELs 106a–106d may be butt coupled directly to the core 110 of the multimode fiber 102. Although the exemplary embodiment of FIG. 1 depicts four VCSELs, an additional number (and thus additional wavelengths) could also be used. It should also be appreciated that different laser array spacing, as well as different fiber diameters, are also-contemplated so long as the desired grouping and spacing of optical elements are at least equal to or less than the multimode fiber diameter.

Figure 2:
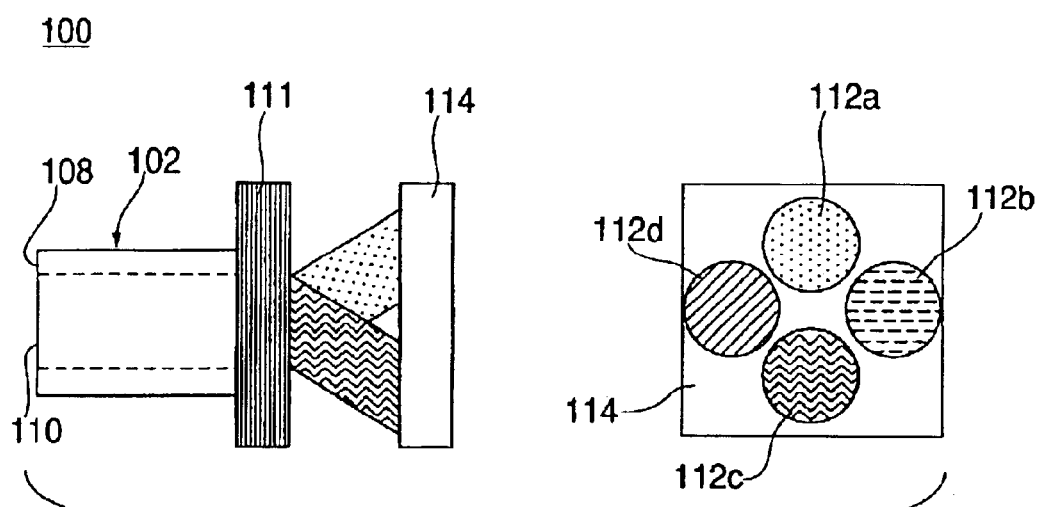
FIG. 2 illustrates an exemplary receiving end of the O/E transceiver of FIG. 1.

Because the multimode fiber 102 transmits multiple wavelengths, the receiving or detection end of the transceiver 100 will necessarily have the capability of separating the signals carried by the different wavelengths of light. Preferably, this is accomplished in a manner so as to minimize the attenuation of the received optical signals. Accordingly, FIG. 2 illustrates an exemplary receiving end of the O/E transceiver 100. As is shown, a hologram 111 is attached to the other end of the fiber 102, and is particularly configured so as to separate and direct the different wavelengths of light to independent photodiodes 112a–112d of a photodiode array 114. The use of hologram 111 as a diffractive element is advantageous as compared with other approaches, such as filters, wherein the optical attenuation may be increased. It will be noted that if a limited number of different wavelengths are used (such as 4 or 6, for example), then the physical spacing between the optical transmitting and receiving devices may be relatively large, thus making it easier for a diffractive element to spatially separate the wavelengths.

As is the case for the VCSCEL array 104, the volume hologram 110 used to demultiplex and separate the four signals may be butt coupled to the multimode fiber 102. This is a low cost method in which a simple x-y mechanical alignment of the fiber with the hologram 111 and/or VCSEL array 104 is accomplished. The fiber 102 may be held in place through a variety of means, including simple mechanical packaging for holding the array or hologram near an optical fiber ferrule endface.

Figure 3:
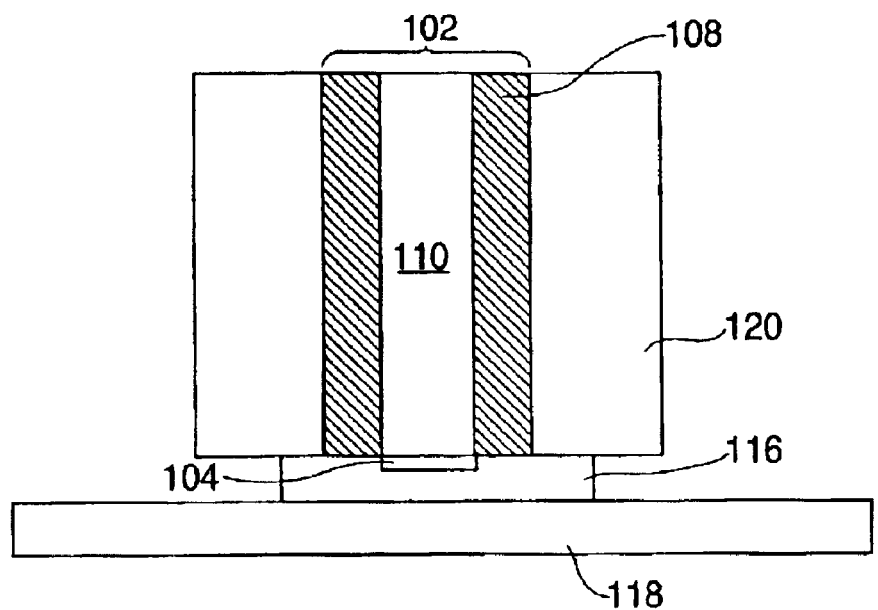
FIG. 3 is a side view of the transmitting end of the O/E transceiver of FIG. 1, particularly illustrating the coupling of a VCSCEL array to a multimode fiber.

FIG. 3 is a side view illustrating the VCSEL array 104 coupled to the multimode fiber, wherein the array 104 is formed within a larger integrated circuit chip 116 with additional drive electronics. The chip 116, in turn, may be mounted on a chip carrier 118 such as a printed circuit board, silicon substrate, glass ceramic multichip module, or other suitable component carrier. Electrical connection between the VCSELs and the chip or substrate is provided by wiring internal to the VCSEL array 104 and by either wire bond or ball grid array attachment to the chip 116 or substrate 118. In the example shown, if each VCSEL is modulated at 10 Gbit/s, then each multimode fiber 102 is capable of handling an aggregate of 40 Gbit/s.

Figure 4:
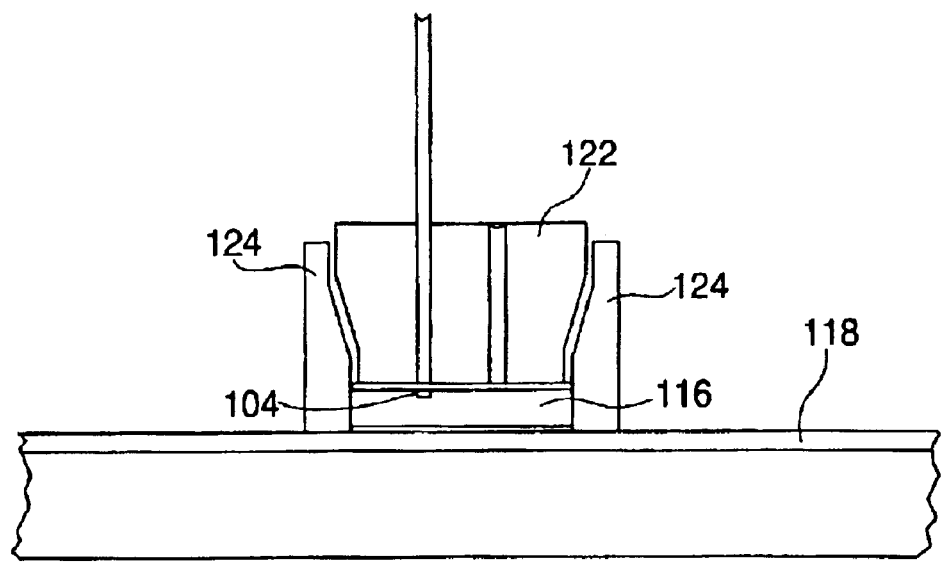
FIG. 4 is a cross sectional view illustrating one possible embodiment of a fiber connector and receptacle housing.

As mentioned previously, standard multimode optical fiber is available in either 50 or a 62.5 micron core diameter, with a 125 micron cladding. In addition, the multimode fiber is often captivated inside a ceramic or polymer ferrule 120 having an outer diameter of several millimeters, in order to facilitate handling and alignment. The ferrule 120 may be housed in any number of industry standard optical connector bodies, which are not shown in FIG. 3 for purposes of clarity. However, FIG. 4 illustrates one possible assembly suitable for the fiber connector and receptacle housing. A male connector plug 122 surrounds one end of the multimode fiber 102 and is configured for mating engagement with a female flange 124 attached to the carrier 118. The optical connector thus defined by male plug 122 and female flange 124 preferably incorporates enough mechanical float so as to allow ferrule alignment with the VCSEL array 104 when locked into the mated position as shown. Particular details regarding of the latching of the connector are well known to those skilled in the art and are not discussed hereinafter. The relaxed alignment tolerances obtained through multimode fiber are reflected in the connector design.

Figure 5:
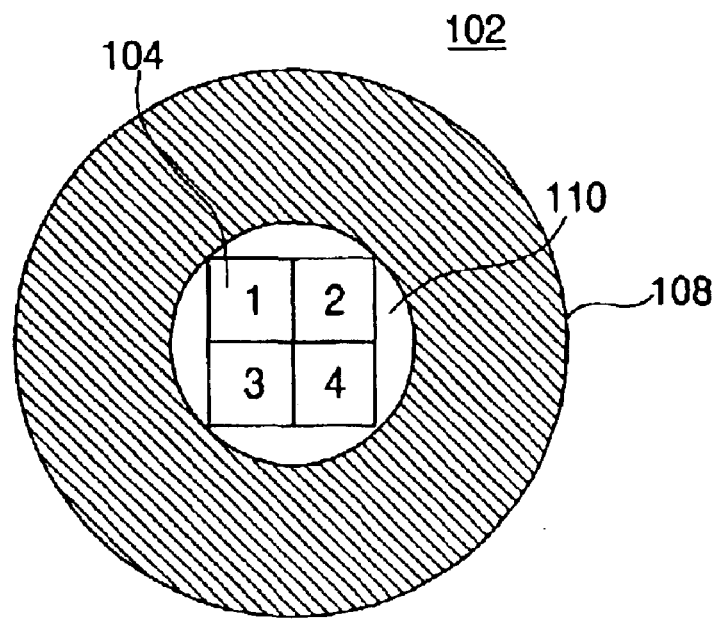
FIG. 5 is an end view that further depicts the fiber to VCSEL alignment shown in FIG. 1.

FIG. 5 is an end view that further depicts the fiber to VCSEL alignment from another perspective, i.e., looking down the optical fiber. Again, it will be seen that a multimode fiber offers a large enough numerical aperture that the individual VCSELs may be butt coupled into the fiber without additional optics. However, alternate embodiments of the present invention could employ various types of coupling optics (at greater expense and complexity) if so desired. In addition, while the fiber alignment of FIG. 5 is passive in two dimensions (a low cost assembly operation), active alignment could alternately be employed. Although some fraction of the optical signal intensity may be lost into the fiber cladding, it is estimated to be a negligible effect as compared with the overall available link budget to support a few hundred meters distance. For the relatively short inter-computer links involved, modal noise and other link effects are not significant. Any of the attenuation loss is in the coupling and de-coupling of light into and out of the fiber, since the attenuation for such a short fiber span is extremely small (e.g., less than a few tenths of a dB).

Figure 6:
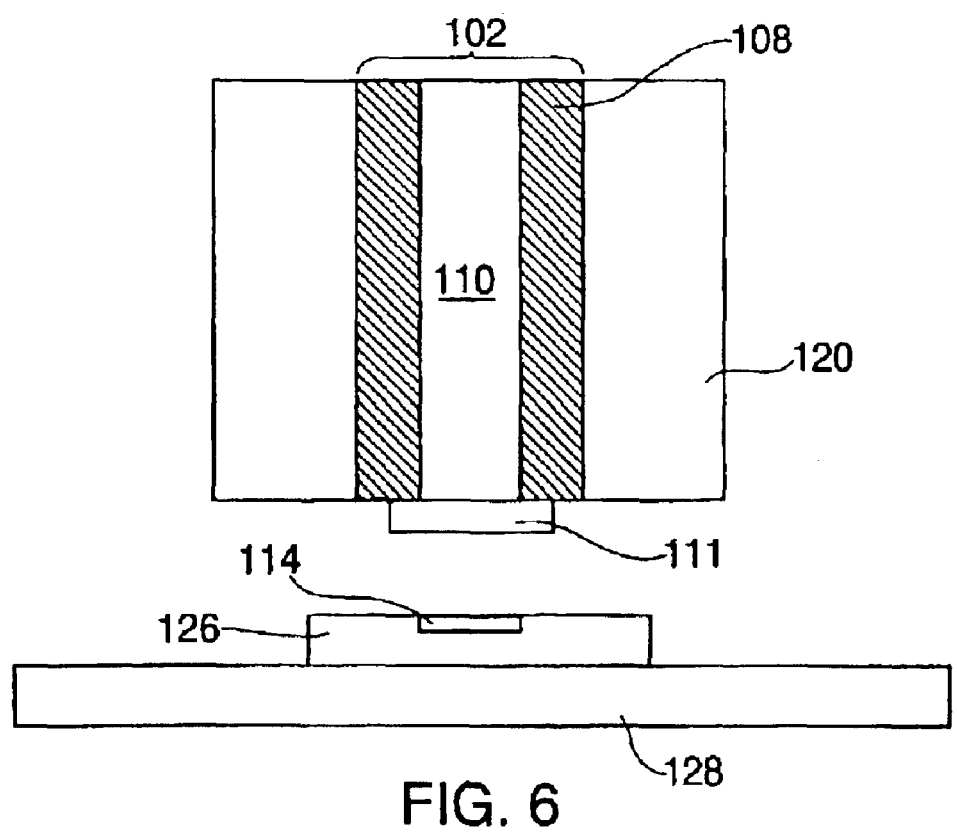
FIG. 6 is a side view of the receiver end of the O/E transceiver, particularly illustrating the coupling of a hologram and photodiode array to the multimode fiber.

Referring now to FIG. 6, there is shown a more detailed view of the receiver end of the transceiver apparatus 100. The hologram 111, which may be a volume hologram or phase hologram, can be fabricated using polymer, plastic, or other suitable materials to redirect the four (or more) wavelengths emerging from the fiber core 110 such that each distinct wavelength falls on a separate photodetector in the array 114. In addition, the hologram 111 is affixed to the fiber endface, and can be designed to separate the wavelengths with better than 90% efficiency. Since the hologram 111 allows multiple wavelengths to be diffracted at very high angles, it may be placed in close proximity or butt coupled with the photodetector array 114 or disposed in close proximity thereto, as shown in FIG. 6. This close proximity also minimizes optical loss at the interface. Because the holograms are computer generated, the particular diffraction pattern thereof may be designed to accommodate the desired number of elements in the photodetector array 114.

Similar to the optical transmitting end of the apparatus 100, the photodetector array 114 may be formed within a larger chip 126 having additional support circuitry, with the chip 126 in turn attached to a larger chip carrier 128, MCM or other substrate. A connector similar to that depicted in FIG. 4 may also be used for securing the receiving end of the fiber 102 and ferrule 120 in optical alignment with the photodetector array 114.

Figure 7:
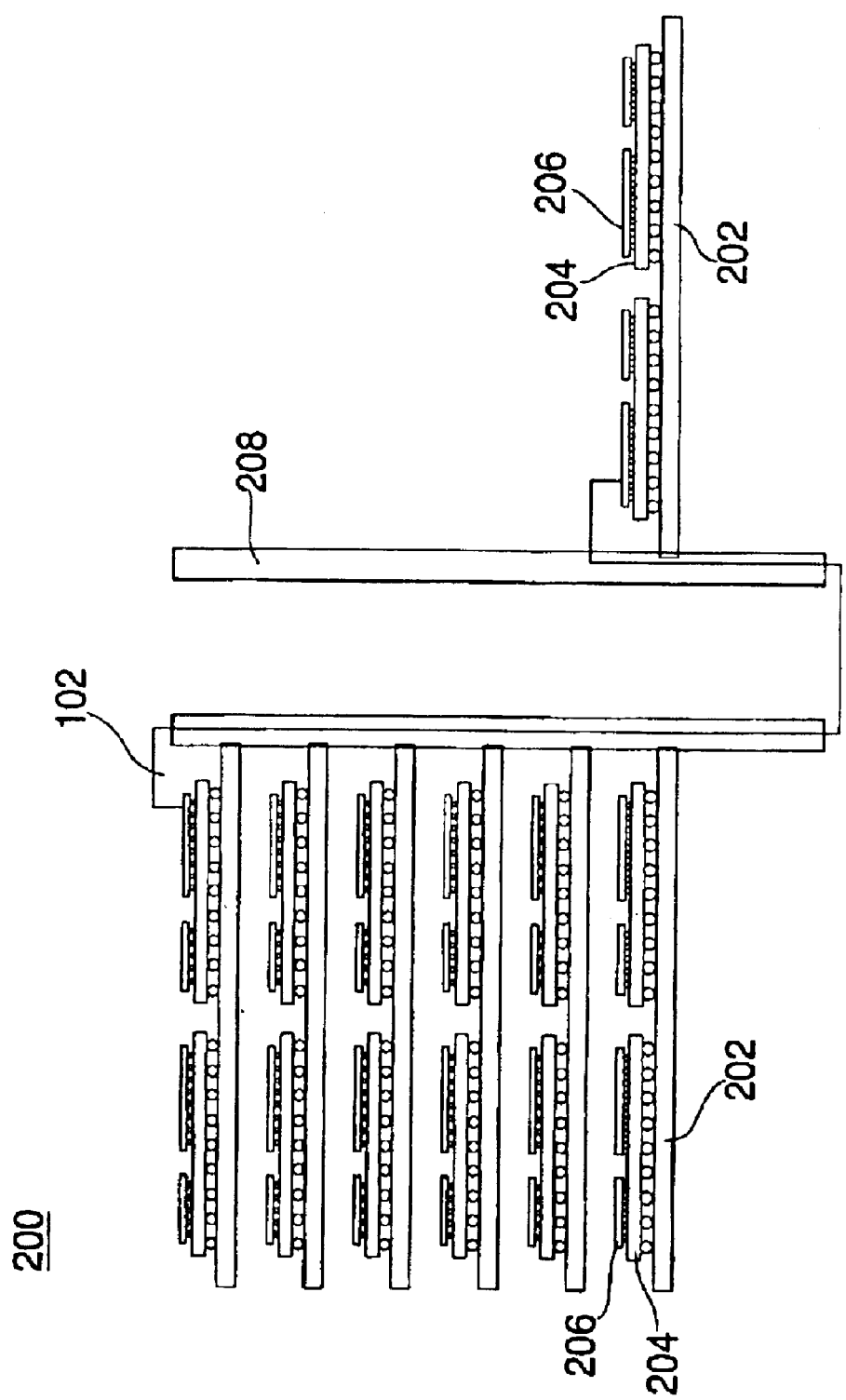
FIG. 7 illustrates a possible system application embodiment in which the above described transceiver apparatus is used to provide interconnections between multiple circuit-cards or planes in a computer system, in accordance with a further aspect of the present invention.

Finally, FIG. 7 is a schematic diagram depicting a possible system application embodiment in which the above described transceiver apparatus is used in a computer backplane interconnection system 200 to provide interconnections between multiple circuit cards 202 or planes therein. Each board 202 may include one or more chip carriers 204 which, in turn, are configured to carry one or more chips 206 thereupon. Some of the chips 206 include optical transmitting and receiving chips (e.g., the VCSCEL and photodiode arrays described earlier). A cable 208 includes one or more multimode fibers 102 carrying, the multiple wavelength optical signals by direct coupling, as described earlier.

The backplane interconnection system 200 may represent backplane interconnections between boards within an individual machine, or between different devices within a network. In order to avoid the need for expensive optical repeater equipment, the cable 208 should be kept to a length of about 300 meters or less. Although a single fiber interconnection is depicted in the example of FIG. 7, it will be appreciated that multiple optical fibers can be routed through the computer boards in order to interconnect various chips or boards. Accordingly, this approach significantly reduces the amount of copper or optical cable used in such an application, thereby simplifying cable management and lowering cable costs.

As will be appreciated, the present embodiments advantageously utilize multimode fiber (having a larger core diameter than single mode fiber) in conjunction with WDM technology for data communication applications. This may be accomplished relatively easily and inexpensively, as the cable length need only run short distances within a computer or multichip module (MCM) system. Furthermore, since most wavelength multiplexing systems employ single mode fiber, with a much smaller core (9 microns diameter), it is not feasible to couple multiple lasers into such a small core without the use of additional, expensive coupling optics. In contrast, the use of multimode fiber in the present invention embodiments is compatible with low cost, butt-coupling of the lasers into the fiber.

Although multimode fiber with multiple wavelengths do not generally support distances longer than a few hundred meters because of fiber bandwidth and link budget considerations, it is more than sufficient for replacement of existing copper wire data buses in backplanes, rack to rack interconnects, or other electronic equipment using data buses, and it offers significantly higher bandwidth than its electronic counterparts. In addition, the use of volume holograms as demultiplexers in multimode fiber systems also serves to facilitate replacement of the existing ribbon cables of optical fiber, and thus improving area density of communication links within servers or MCMs.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optoelectronic transceiver assembly, comprising:
   a plurality of optical transmission devices coupled to a first end of a multimode optical fiber core, each of said plurality of optical transmission devices generating light at a different wavelength with respect to one another;
   a wavelength demultiplexing device coupled to a second end of said multimode optical fiber core; and
   a plurality of optical detection devices in proximity to said demultiplexing device, said optical detection devices for receiving light transmitted by said plurality of optical transmission devices.

2. The optoelectronic transceiver assembly of claim 1, wherein said wavelength demultiplexing device further comprises a hologram, said hologram configured to direct light of said different wavelengths to different ones of said optical detection devices.

3. The optoelectronic transceiver assembly of claim 2, wherein said hologram is butt coupled to said second end of said multimode optical fiber core.

4. The optoelectronic transceiver assembly of claim 1, wherein said plurality of optical transmission devices further comprises a monolithic array of vertical cavity surface emitting lasers (VCSELs).

5. The optoelectronic transceiver assembly of claim 4, wherein said VCSELs are grouped together in a generally square pattern and have a center to center spacing of about 20 to about 30 microns therebetween.

6. The optoelectronic transceiver assembly of claim 5, wherein said array of VCSELs is butt coupled to said first end of said multimode fiber core.

7. The optoelectronic transceiver assembly of claim 5, wherein said array of VCSELs comprises at least two individual VCSELs.

8. The optoelectronic transceiver assembly of claim 1, wherein said plurality of optical detection devices further comprises a monolithic array of photodiodes.

9. An optoelectronic transceiver assembly, comprising:
   a plurality of vertical cavity surface emitting lasers (VCSELS) butt coupled to a first end of a multimode optical fiber core, each of said plurality of VCSELs generating light at a different wavelength with respect to one another;
   a hologram, butt coupled to a second end of said multimode optical fiber core, said hologram configured for demultiplexing light of said different wavelengths; and a plurality of photodiodes in proximity to said hologram, wherein said hologram is further configured to direct light of said different wavelengths to different ones of said photodiodes.

10. The optoelectronic transceiver assembly of claim 9, wherein said VCSELs are grouped together in a generally square pattern and have a center to center spacing of about 20 to about 30 microns therebetween.

11. The optoelectronic transceiver assembly of claim 10, wherein said hologram comprises a volume hologram.

12. The optoelectronic transceiver assembly of claim 10, wherein said array of VCSELs comprises at least four individual VCSELs.

13. A computer backplane interconnection system, comprising:
   a first backplane having a first chip carrier associated therewith and a second backplane having a second chip carrier associated therewith; and
   an optoelectronic transceiver assembly for providing signal communication between a first chip associated with said first chip carrier and a second chip associated with said second chip carrier, said optoelectronic transceiver further comprising:
   a plurality of optical transmission devices coupled to a first end of a multimode optical fiber core, each of said plurality of optical transmission devices generating light at a different wavelength with respect to one another;
   a wavelength demultiplexing device coupled to a second end of said multimode optical fiber core; and
   a plurality of optical detection devices in proximity to said demultiplexing device, said optical detection devices for receiving light transmitted by said plurality of optical transmission devices.

14. The computer backplane interconnection system of claim 13, wherein said wavelength demultiplexing device further comprises a hologram, said hologram configured to direct light of said different wavelengths to corresponding ones of said optical detection devices.

15. The computer backplane interconnection system of claim 14, wherein said hologram is butt coupled to said second end of said multimode optical fiber core.

16. The computer backplane interconnection system of claim 13, wherein said plurality of optical transmission devices further comprises a monolithic array of vertical cavity surface emitting lasers (VCSELs).

17. The computer backplane interconnection system of claim 16, wherein said VCSELs are grouped together in a generally square pattern and have a center to center spacing of about 20 to about 30 microns therebetween.

18. The computer backplane interconnection system of claim 17, wherein said array of VCSELs is butt coupled to said first end of said multimode fiber core.

19. The computer backplane interconnection system of claim 17, wherein said array of VCSELs comprises at least four individual VCSELs.

20. The computer backplane interconnection system of claim 9, wherein said plurality of optical detection devices further comprises a monolithic array of photodiodes.

* * * * *